(12) United States Patent
Idemura

(10) Patent No.: US 7,800,654 B2
(45) Date of Patent: Sep. 21, 2010

(54) IMAGE PICKUP APPARATUS

(75) Inventor: Takeshi Idemura, Saitama (JP)

(73) Assignee: Canon Kabushiki Kaisha (JP)

(\*) Notice: Subject to any disclaimer, the term of this patent is extended or adjusted under 35 U.S.C. 154(b) by 376 days.

(21) Appl. No.: 11/538,609

(22) Filed: Oct. 4, 2006

(65) Prior Publication Data

US 2007/0109418 A1 May 17, 2007

(30) Foreign Application Priority Data

Oct. 4, 2005 (JP) .............................. 2005/291347

(51) Int. Cl.
*H04N 5/232* (2006.01)
(52) U.S. Cl. ............................................... 348/211.99
(58) Field of Classification Search .. 348/211.1–211.14
See application file for complete search history.

(56) References Cited

U.S. PATENT DOCUMENTS

| | | | |
|---|---|---|---|
| 5,068,735 A | 11/1991 | Tuchiya et al. | |
| 7,057,643 B2* | 6/2006 | Iida et al. ................ | 348/208.14 |
| 7,140,789 B1* | 11/2006 | Reinert .................... | 348/211.99 |
| 7,161,624 B1* | 1/2007 | Kurita ..................... | 348/211.99 |
| 7,379,664 B2* | 5/2008 | Marcus ..................... | 396/56 |
| 7,400,348 B2* | 7/2008 | Hoyos ..................... | 348/211.99 |
| 7,400,789 B2* | 7/2008 | Hoyos ..................... | 348/211.99 |
| 2003/0025802 A1* | 2/2003 | Mayer et al. ........... | 348/211.99 |
| 2003/0165192 A1* | 9/2003 | Kitta ....................... | 375/240.01 |
| 2004/0169733 A1 | 9/2004 | Ishizaka et al. | |
| 2004/0184798 A1 | 9/2004 | Dumm | |
| 2005/0012824 A1* | 1/2005 | Stavely et al. .......... | 348/211.99 |
| 2005/0264655 A1* | 12/2005 | He ........................... | 348/211.99 |
| 2006/0023110 A1* | 2/2006 | Sasaki et al. ............. | 348/349 |
| 2006/0061664 A1* | 3/2006 | Ito ........................... | 348/211.11 |
| 2006/0139459 A1* | 6/2006 | Zhong ..................... | 348/211.2 |

FOREIGN PATENT DOCUMENTS

| | | |
|---|---|---|
| JP | 5-110923 | 4/1993 |
| JP | 05-110923 | 4/1993 |
| JP | 6-038079 | 2/1994 |
| JP | 2002-094868 | 3/2002 |

OTHER PUBLICATIONS

Extended European Search Report dated Jan. 16, 2007 for European counterpart application No. 06121752.7-2202.

\* cited by examiner

*Primary Examiner*—Lin Ye
*Assistant Examiner*—Trung Diep
(74) *Attorney, Agent, or Firm*—Rossi, Kimms & McDowell LLP

(57) ABSTRACT

Disclosed is a picture-taking apparatus including an apparatus main body and a remote control device for controlling the apparatus main body, wherein the apparatus main body includes an image-pickup optical system having a plurality of movable optical elements, an actuator for moving the plurality of optical elements, a first optic operating member for instructing movement of the plurality of optical elements, an image-pickup unit having an image pickup device for photoelectrically converting light from the image-pickup optical system, a first image-pickup operation member for instructing image-pickup operation of the image-pickup unit, a picture-taking direction operation unit for controlling a picture-taking direction of the apparatus main body, (vii) a picture-taking direction driving unit for moving the apparatus main body into the picture-taking direction, and an apparatus-main-body-side communication unit for enabling communication with the remote control device, and wherein the remote control device includes a second optic operating member for instructing movement of the plurality of optical elements of the image-pickup optical system, a second image-pickup operation member for instructing image-pickup operation of the image pickup unit, a picture-taking direction operation member for instructing a picture-taking direction to the picture-taking direction driving unit, and a remote-control-device-side communication unit for enabling communication with the apparatus main body.

4 Claims, 12 Drawing Sheets

IMAGE PICKUP APPARATUS

FIELD OF THE INVENTION AND RELATED ART

This invention relates to a picture-taking apparatus for use in a television picture-taking operation.

Picture-taking apparatuses to be used in television picture taking operation in athletics or sport stadiums have a structure such as shown in FIG. 10, wherein a picture-taking device 3 having a television camera 2 and a television lens 1 mounted thereon is placed on a tripod 4. The picture-taking operation is carried out outside the athletic field to avoid possible interference of the picture-taking operation with the game or competition.

A camera operator operates a zoom lens and a focusing lens of the television lens 1 through a demand 5 which is attached to the tripod 4. Furthermore, the camera operator operates a pan rod 6 attached to the tripod 4 to adjust the picture-taking position (attitude) with respect to pan and tilt directions. In the field picture-taking operation, in order to take dynamic pictures from a position far remote from the photographic subject, in many cases the player or players are photographed in close-up. In order to make it sure to accurately follow quick motions of the photographic subject under these conditions, highly skilled camerawork using the pan rod 6 is required. The camera operator has to stand in an upright stance and accurately operate the zoom lens, the focusing lens, and the attitude of pan and tilt while concentrating the nerves of his/her whole body thereto. In order to assist this, the picture-taking apparatus has a structure designed to assure good maneuverability that enables camerawork making the best use of the operator's hands and feet.

Japanese Laid-Open Patent Application, Publication No. 06-38079 shows a different type of picture-taking method in which, for field picture-taking operation, a universal head system is used to maneuver the camera through wireless remote control. According to this method, a broad picture of the stadium as a whole will be taken from a very high position where the camera operator cannot stand easily, and pictures lively telling the atmosphere of the whole stadium will be taken.

Japanese Laid-Open Patent Application, Publication No. 05-110923 shows another picture-taking method in which a crane machine is placed near the field and a camera is set at the top of the crane machine, wherein the camera at the crane machine top is controlled from the bottom of the crane machine. In this case, although the position is not very high as in the case using a universal head, a picture can be taken from a relatively high view point.

As described above, in relation to the picture-taking operation in athletic fields, various picture-taking methods have been attempted to take pictures of good liveliness, using different picture-taking apparatuses.

On the other hand, in the field picture-taking operation, generally the picture-taking position is placed outside the field to avoid possible interference of the picture-taking operation with the game or competition. In this case, by using a lens having long focal length, close-up pictures of a photographic subject can be taken. However, since the pictures are taken from out of the field, the picture-taking attitude is quite restricted. As a result, pictures obtainable therefrom would inevitably be almost the same. Furthermore, because of the difficulty in taking pictures at a distance close to the players, there is a limitation in making pictures having good liveliness.

The problems described above might be solved by providing, inside the field, a universal head system that can be maneuvered by remote control and by placing a picture-taking camera inside the housing of the universal head so that the camera is controlled by remote control. However, a controller of such universal head system arranged to be maneuvered upon a table is designed to take pictures of a photographic subject that does not move much, typically such as in the case of surveillance. The manner of operation that the operator operates by his/her fingers various operation knobs arrayed uniformly in an array on a box-shaped operation panel completely differs from what is done when the camera operator directly operates the television camera. Practically, it is very hard to use.

More particularly, the pan and tilt operation is performed by tilting a rod-like joystick. In proportion to this tilt angle, the rotational speed for the pan and tilt is determined. Therefore, the universal head controller described above would not be suitable as a maneuvering tool for the field picture-taking operation that must be controlled to promptly follow quick motions of the photographic subject. Hence, it is desirable to provide a picture-taking apparatus which can be maneuvered even through remote control, by using the same sense of maneuverability as of an ordinary field camera wherein the picture-taking attitude or lens position can be adjusted quickly by using the operator's whole body.

On the other hand, the universal head system is connected through cables to the controller that controls, by remote control, the main body of the picture-taking apparatus having a camera mounted thereon. The presence of such cables leads to another limitation. Namely, in athletics stadiums, for example, due to the presence of cables, the picture-taking position can not be changed promptly to meet the situation, that is, in accordance with the competition event which is just going to be initiated.

In a picture-taking operation using a crane machine, pictures could be taken through a sense of maneuverability quite similar to that of a field picture-taking television camera. However, since the crane machine is very large, on one hand it is an eyesore for the players and interrupts their concentration into the play, and on the other hand it obstructs spectators' watching the game or competition. Furthermore, from the structural standpoint, there is a limitation in the height of the crane. Thus, the height of the eye view for taking pictures is never unlimited. Additionally, for every picture-taking work, the crane machine must be assembled and then disassembled. Therefore, in an athletics stadium wherein different athletic events are carried out at the same time, it is very hard to change the picture-taking position quickly to meet the situation in accordance with the events to be picture-taken.

SUMMARY OF THE INVENTION

It is accordingly an object of the present invention to provide a picture-taking apparatus having good maneuverability which, when disposed in a field, for example, can be controlled by an operator through remote control, in accordance with a sense of maneuverability as like directly maneuvering a field camera.

It is another object of the present invention to provide a picture-taking apparatus which is very convenient in use, in that the picture-taking position can be changed quickly to meet the situation.

In accordance with an aspect of the present invention, to achieve these objects, there is provided a picture-taking apparatus, comprising: an apparatus main body; and a remote control device for controlling said apparatus main body; wherein said apparatus main body includes (i) an image-pickup optical system having a plurality of movable optical elements, (ii) an actuator for moving said plurality of optical elements, (iii) a first optic operating member for instructing movement of said plurality of optical elements, (iv) an image-pickup unit having an image pickup device for photoelectrically converting light from said image-pickup optical system, (v) a first image-pickup operation member for instructing image-pickup operation of said image-pickup unit, (vi) a picture-taking direction operation unit for controlling a picture-taking direction of said apparatus main body, (vii) a picture-taking direction driving unit for moving said apparatus main body into the picture-taking direction, and (viii) an apparatus-main-body-side communication unit for enabling communication with said remote control device; and wherein said remote control device includes (ix) a second optic operating member for instructing movement of said plurality of optical elements of said image-pickup optical system, (x) a second image-pickup operation member for instructing image-pickup operation of said image pickup unit, (xi) a picture-taking direction operation member for instructing a picture-taking direction to said picture-taking direction driving unit, and (xii) a remote-control-device-side communication unit for enabling communication with said apparatus main body.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings. Specifically, the present invention will be explained in detail with respect to embodiments shown in FIGS. 1-9 of the drawings.

Embodiment 1

Figure 1:
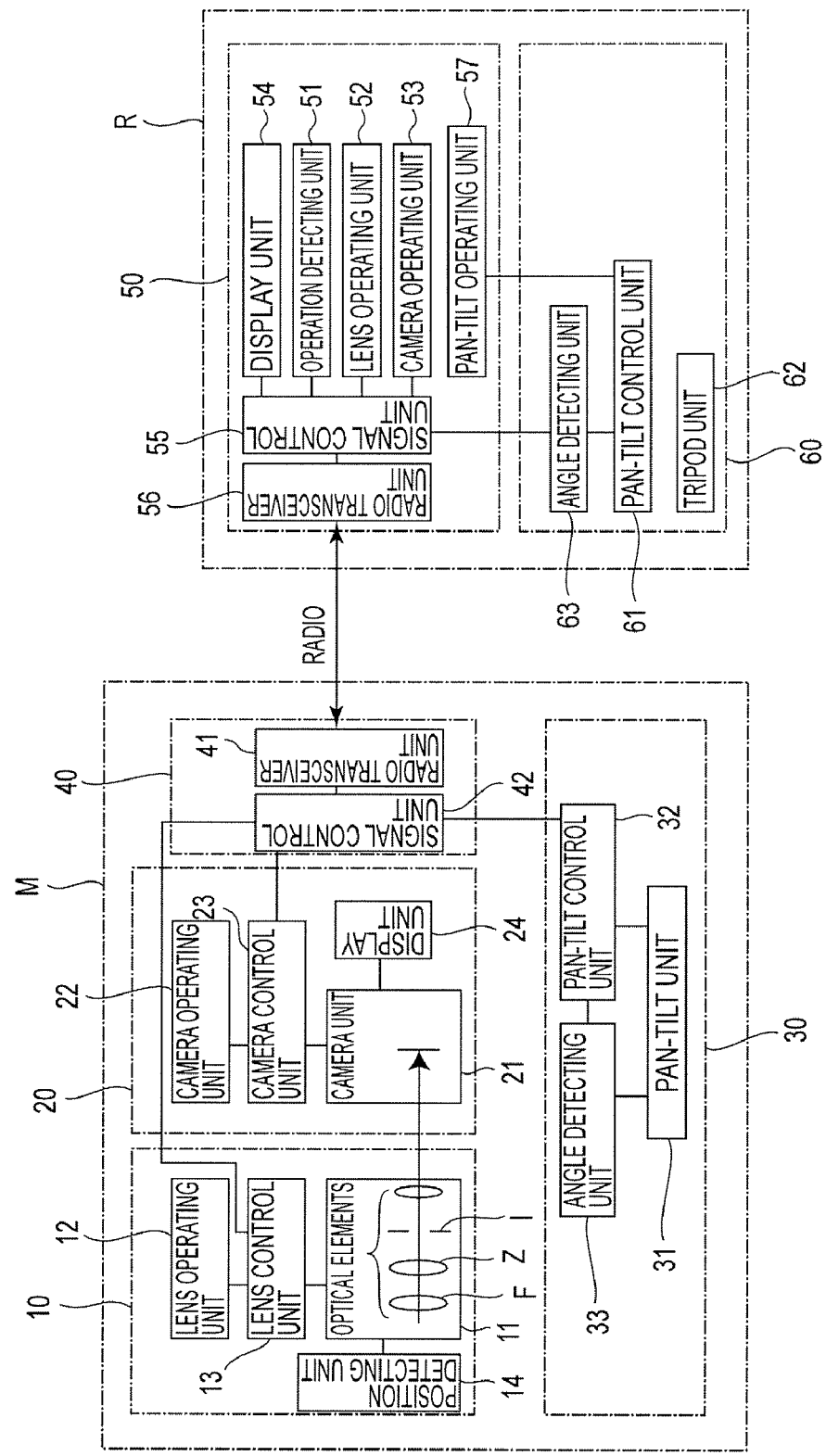
FIG. 1 is a block diagram for explaining the structure of a first embodiment of the present invention.

FIG. 1 is a general block diagram of a picture-taking apparatus according to an embodiment of the present invention, which is arranged to perform television picture-taking operation in a field, for example. Basically, the picture-taking apparatus comprises two devices: that is, a picture-taking apparatus main body M having lenses and a camera, for taking video images; and a remote controller R which is a remote control device for controlling the apparatus main body M from a distance. These two devices, namely, the apparatus main body M and the remote controller R, are made two-way communicable each other through radio. The apparatus main body M can be placed in a field so as to take lively pictures, while the remote controller R which is operated by a camera operator can be placed outside the field so that it does not interfere with the picture-taking.

The picture-taking apparatus main body M comprises a lens unit device 10, a camera unit device 20, a base unit device 30 and a communication unit device 40.

Inside the lens unit device 10, there are optical elements 11 including a focusing lens F, a zoom lens Z and an iris I, which are to be operated by the camera operator. Furthermore, inside the lens unit device 10, there are a lens operating unit 12 for instructing electric drive of the optical elements 11, a lens control unit 13 for performing the electric drive on the basis of a command from the lens operating unit 12, and a position detecting unit 24 for detecting the position of the focusing lens F, for example, of the optical elements 11.

The camera unit device 20 comprises a camera unit 21 including an image pickup device for photoelectrically converting the light collected by the optical elements 11. An output of a camera control unit 23, having a function for processing images taken in accordance with a command from a camera operating unit 22, is connected to this camera unit 21. An output of the camera unit 21 is connected to an image display unit provided on the outer casing of the apparatus main body M.

The base unit device 30 comprises a pan and tilt unit 31 having a mechanism for rotationally moving the apparatus main body M manually or electrically along a horizontal direction and a vertical direction, a pan and tilt control unit 32 which is electrically driven, and an angle detecting unit 33 for detecting rotational angles for pan and tilt, respectively.

In recent years, even in relation to the field picture-taking operation, in many cases real images are synthesized with computer graphics to produce virtual images. In this connection, the positional information about the zoom lens Z, focusing lens F and iris I as well as the angular information about the pan and tilt unit 31 that represents the picture-taking attitude should desirably be detected very precisely. To this end, in this embodiment, encoders are used to carry out the position and angle detection.

The communication unit device 40 comprises a radio transceiver unit 41 for enabling wireless communication with the remote controller R, and a signal control unit 42 for distributing signals received at the radio transceiver unit 41 to respective control units, that is, lens control unit 13, camera control unit 23 and pan and tilt control unit 32.

The remote controller R comprises two unit devices, that is, a control unit device 50 for sending commands to the picture-taking apparatus main body M from a distance, and a base unit device 60 for supporting the control unit device 50. These two unit devices are made demountably mountable, to assure easy portability by the camera operator.

The control unit device 50 comprises an operation detecting unit 51, a lens operating unit 52, a camera operating unit 53, a display unit 54, a signal control unit 55, a radio transceiver unit 56, and a pan and tilt operating unit 57. The operation detecting unit 51 functions to detect the amount of operation of the lens operating unit 52 that instructs driving of the optical elements such as focusing lens F, zoom lens Z and iris I. The camera operating unit 53 serves to instruct camera operation. The display unit 54 is operable to display images taken by the camera. These components are connected to the signal control unit 55. The signal control unit 55 is connected to the radio transceiver unit 56 which enables wireless communication with the apparatus main body M. The pan and tilt operating unit 57 functions to manually control the attitude of the whole control unit device 50 manually.

The base unit device 60 comprises a pan and tilt control unit 61 having a mechanism for rotationally moving the whole control unit device 50 in horizontal and vertical directions, and a tripod unit 62 for supporting the pan and tilt control unit 61. Furthermore, there is an angle detecting unit 63 having an encoder for high-precision position detection, for detecting rotational angles of the pan and tilt, respectively. The output of this angle detecting unit 63 is connected to the signal control unit 55.

Operational information from the lens operating unit 52, the camera operating unit 53 and the pan and tilt control unit 61 is supplied from the signal control unit 55 through the radio transceiver unit 56 to the apparatus main body M, thereby to drive the same. Furthermore, lens positional information and the pan and tilt angular information of the apparatus main body M as well as images taken by the camera are received by the radio transceiver unit 56, and they are displayed at the display unit 54.

Figure 2:
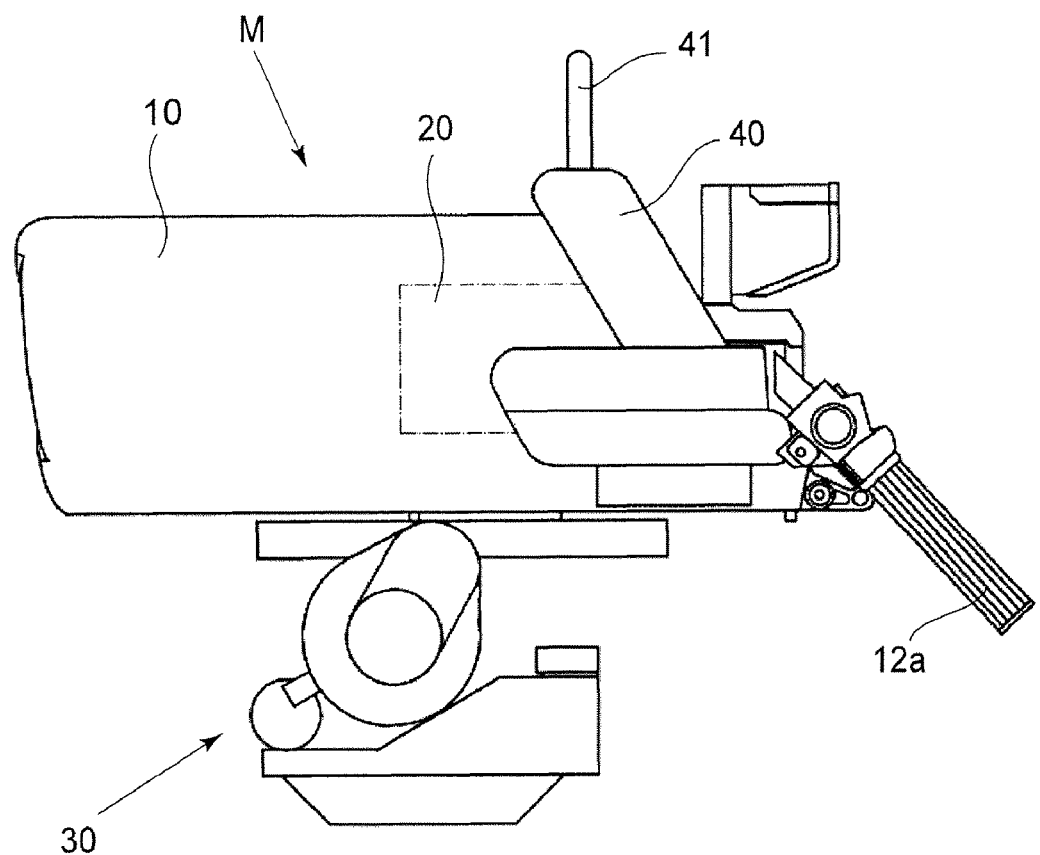
FIG. 2 is a side view of a main body of a picture-taking apparatus, to which an embodiment of the present invention is applied.
Figure 3:
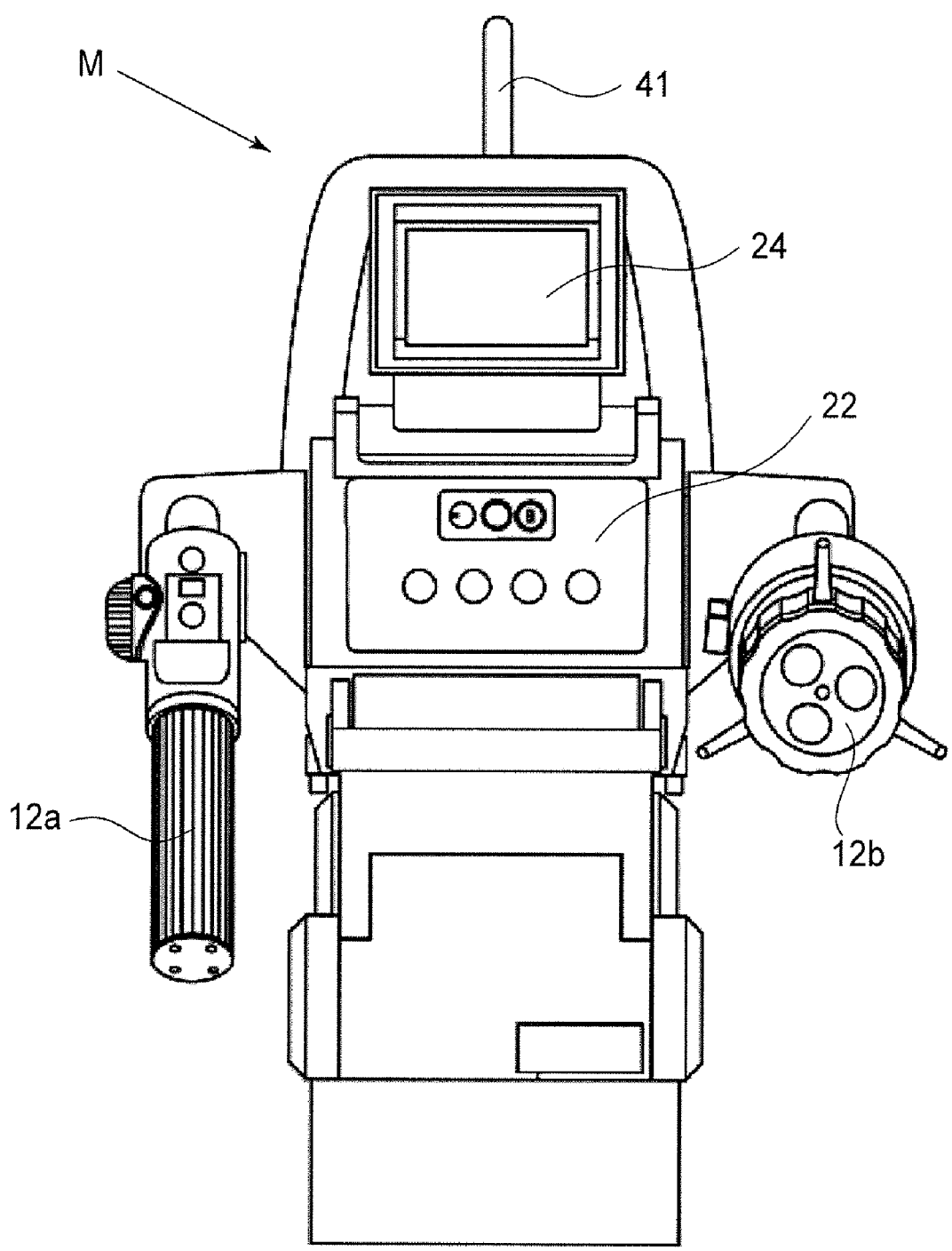
FIG. 3 is a rear view of the main body of the picture-taking apparatus.

FIG. 2 is a side view of the picture-taking apparatus main body M, and FIG. 3 is a rear view of the same. As shown in these drawings, there are the lens unit device 10, the camera unit device 20 for converting light collected by the lens unit device 10 into electronic images, and the communication unit device 40 for enabling wireless communication of information with the remote controller R, all of which are mounted on the base unit device 30. Furthermore, there are a zoom demand 12*a* for instructing driving of the zoom lens Z and a focus demand 12*b* for instructing driving of the focusing lens F. These demands 12*a* and 12*b* are components of the lens operating unit 12.

For manual operation, the camera operator grips by his/her hands the zoom demand 12*a* and the focus demand 12*b* of the picture-taking apparatus main body M and, while operating the zoom lens Z and the focusing lens F, the operator manually controls the attitude of the camera unit 20 with respect to the pan and tilt directions. It is as a matter of course possible to place the apparatus main body M outside the field and the camera operator directly operates the same as like an ordinary field lens to take pictures. For electric operation, a motor provided in the pan and tilt control unit 32 receives a command signal from the outside and, in response, it performs the control.

As described, the apparatus main body M is arranged not only to enable an electrically driven operation based on command signals supplied from the remote controller R, but also to enable direct manual operation by the operator. In order to select the position inside the field of the stadium where the apparatus main body M should be set, it would be better that the picture composition can be checked by the camera operator while he/she directly maneuvers the apparatus main body M. Hence, in accordance with this embodiment, the camera operator can move the zoom demand 12*a* and the focus demand 12*b* left and right and up and down, to electrically drive the zoom lens Z and the focusing lens F, while checking the image at the display unit 24.

Figure 4:
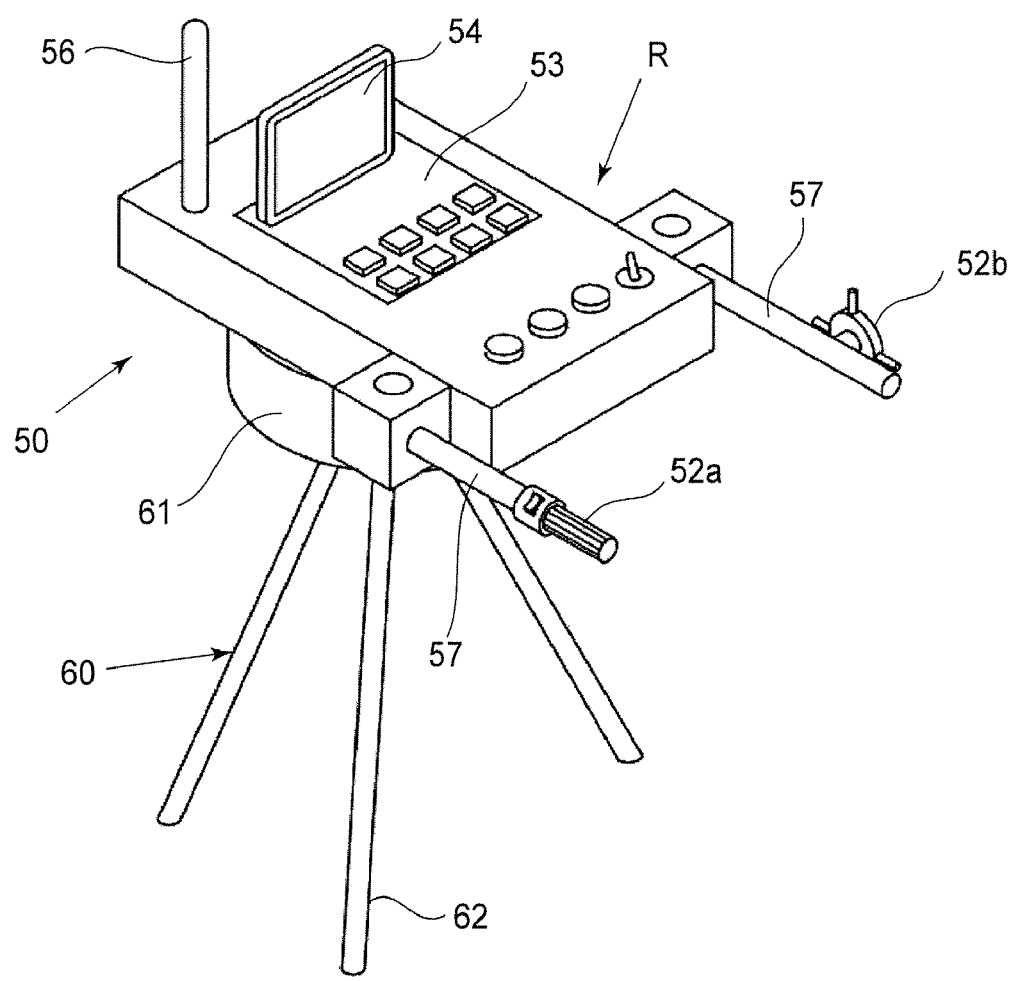
FIG. 4 is a perspective view of the outside appearance of a remote controller.

FIG. 4 is a perspective view of an outside appearance of the remote controller R. The control unit device 50 is mounted on the base unit device 60. The lens operating unit 52 of the control unit device 50 includes a zoom demand 52*a* for instructing a zooming operation of the zoom lens Z, and a focus demand 52*b* for instructing a focusing operation of the focusing lens F. Particularly, a high-resolution encoder is used in a detecting system of the focus demand 52*b* because a very high precision operation is required therein. Here, it should be noted that the zoom lens Z of the apparatus main body M is driven on the basis of velocity control, while the iris I and the focusing lens F are driven on the basis of position control.

The zoom demand 52*a* and the focus demand 52*b* have a similar shape as of the zoom demand 12*a* and the focus demand 12*b* of the apparatus main body M, and they are fixed to a free end portion of the pan and tilt operating unit 57. Hence, while standing upright, the camera operator can grip these two demands by his/her hands and, while checking the image just being taken, at the display unit 54, he/she can control the zoom lens Z and/or the focusing lens F and also control the attitude operation of the pan and tilt unit 31 by using his/her whole body.

Thus, in accordance with this embodiment, the operator can control the picture-taking main body M disposed inside the field, from a distance and through the remote controller R, yet by using the same sense of maneuverability as if he/she directly maneuvers an ordinary field camera. Therefore, the camerawork accurately reflecting the sense of maneuverability that the field camera operator has acquired during his/her experience of work can be accomplished. Furthermore, since the apparatus main body M and the remote controller R are wireless communicable each other and conventionally used cables are unnecessary, the camera setting work is easy and the picture-taking position can be changed promptly to meet the situation in accordance with the competition event to be picture-taken. Thus, it has a good convenience in use.

Figure 5:
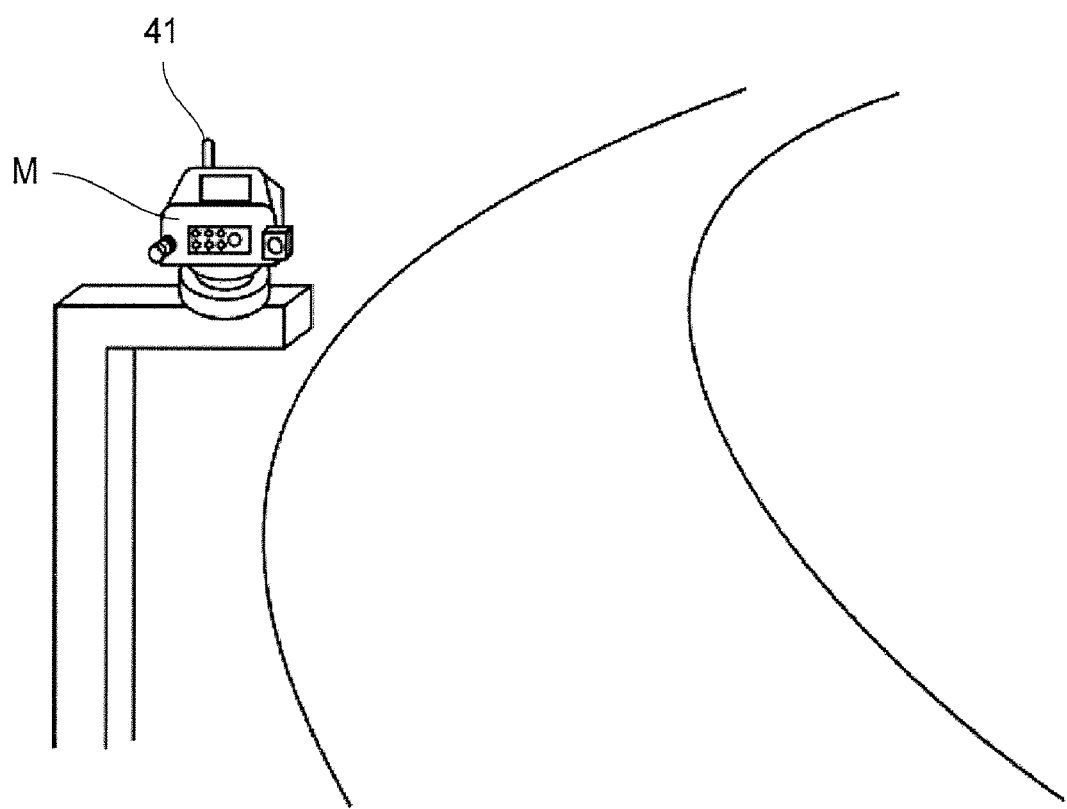
FIG. 5 is a perspective view for explaining an example of the situation for taking pictures.

FIG. 5 shows an example in which the picture-taking apparatus main body M is disposed inside an athletic track. Since the camera is placed inside the field, pictures having good liveliness can be taken from a distance very close to the players.

Where a picture-taking apparatus main body M is controlled by remote control from a distance as in the example of the picture-taking apparatus of this embodiment, at the stage of camera setting prior to start of the picture-taking operation it will be necessary to provide positional consistency between the apparatus main body M and the remote controller R. Here, in this embodiment, not only on at the remote controller R side but also at the apparatus main body side there is provided a device having a function for instructing lens positions as well as pan and tilt positions. Hence, command signals supplied from theses two operating devices should be unified.

Furthermore, in addition to achieving high-precision control, it is necessary to obtain high-resolution data concerning the lens position and the pan and tilt angles, as these are required for virtual images. To this end, in this embodiment, increment type encoders are used in the detection systems for the focusing lens F, the zoom lens Z and the iris I of the optical elements 11 and for the pan and tilt unit 31.

Furthermore, encoders are used in the detecting systems for the focus demand 52*b* and the pan and tilt control unit 61 at the remote controller R side. Since the encoder detects a relative position, not an absolute position, in both of the apparatus main body M and the remote controller R, an origin setting operation (origin initialization) for determining an origin position should be carried out when the power source is turned on, to set the absolute position.

Figure 6A:
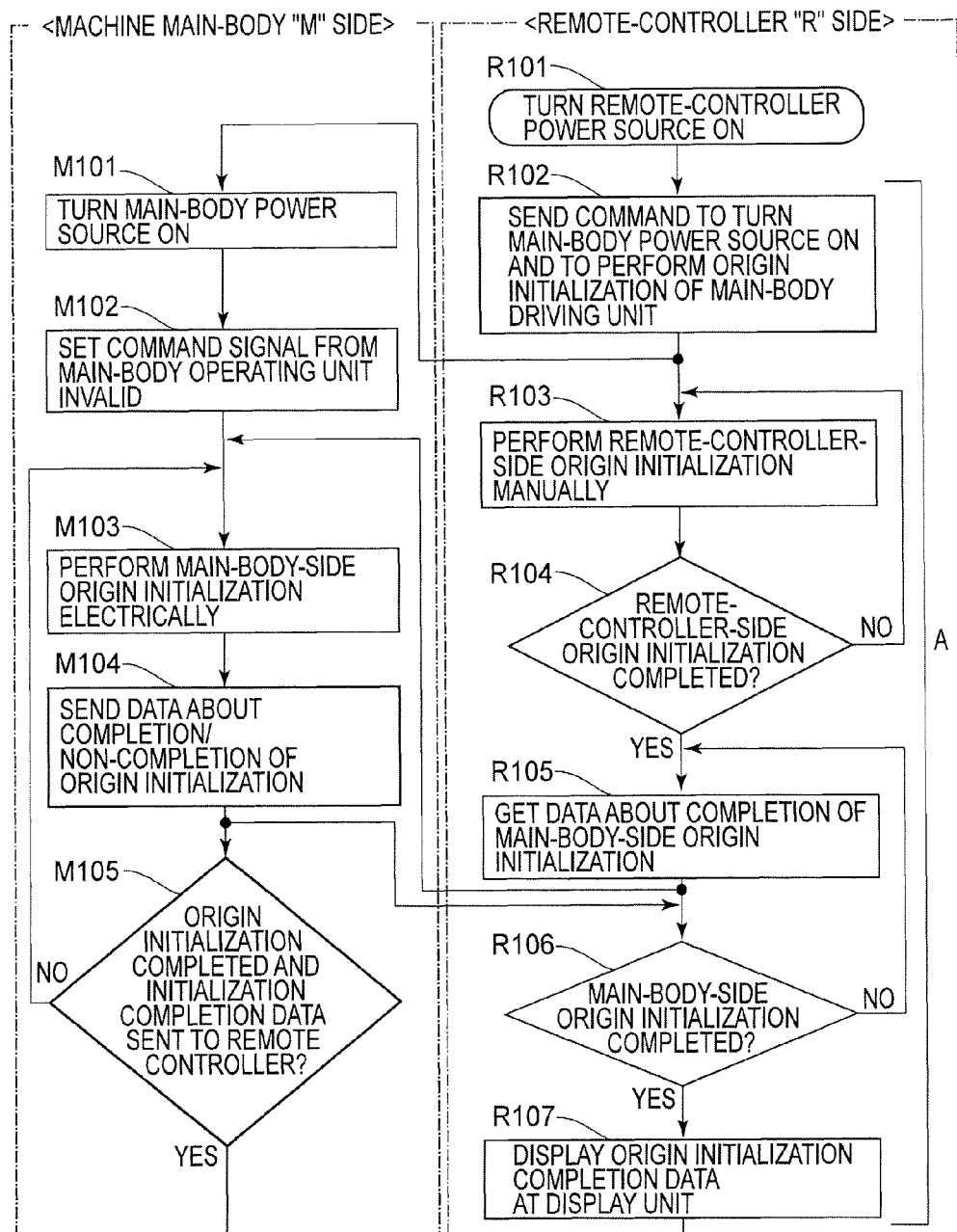
FIG. 6 is a flow chart for explaining an initialization procedure according to an embodiment of the present invention.
Figure 6B:
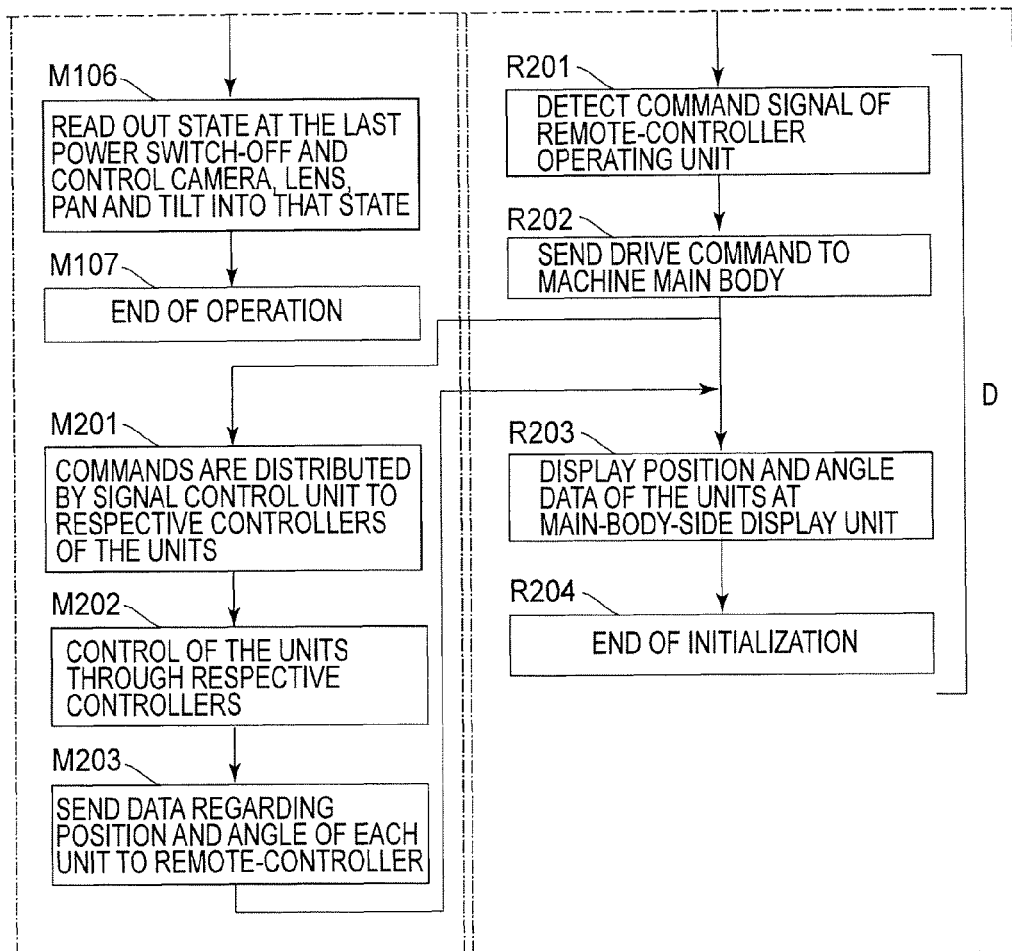
Figure 6:
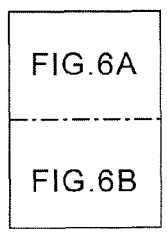

FIG. 6 is a flow chart for explaining an initialization procedure for alignment between the picture-taking apparatus main body M and the remote controller R, at a stage prior to start of the remote-controlled picture taking operation. Specifically, this flow chart shows sequences of the initialization at the apparatus main body M side and the remote controller R side, after the power source of the remote controller R is turned on. The left-hand side of FIG. 6 shows the flow at the apparatus main body M side, and the right hand side of FIG. 6 shows the flow at the remote controller R side. The sequence of initialization procedure comprises two flows, that is, an origin initialization flow A and a flow D for performing positional alignment between the apparatus main body M and the remote controller R.

When the power source of the remote controller R is turned on (step R101), a command signal for turning the power source of the apparatus main body M on and a command signal for performing the origin initialization at the driving unit of the apparatus main body M are outputted (step R102). At steps R103 and R104, the operator of the remote controller R manually moves the focus demand 52*b* and the pan and tilt control unit 61 to accomplish the origin initialization of the encoder (detection system). The origin initialization can be carried out as follows: within the detection range, there is a single spot for detecting a photo-interrupter, and thus an absolute position can be detected by using that spot as a reference point.

At the apparatus main body M side, the power source of the apparatus main body M is turn on at step M101. Then, in order to avoid any accidental operation in response to a drive command from the operating members of the apparatus main body M, command signals from the operating units of the apparatus main body M are invalidated. At steps M103 to M105, origin initialization of the zoom lens Z, the focusing lens F, the iris I and the pan and tilt unit 31 at the apparatus main body M side is carried out electrically. Specifically, at step M104, in response to an enquiry concerning completion of the origin initialization from the apparatus main body M side at step R105, completion or non-completion of the origin initialization is replied to the apparatus main body M side. Steps M103 to M105 are repeated until the origin initialization at the apparatus main body M side is accomplished.

If the origin initialization at the apparatus main body M side is completed (step M105), the positions and states of the camera, lenses and pan and tilt as the power source was switched off last time, having been memorized at the apparatus main body M side, are recovered or resumed, and the origin initialization procedure at the apparatus main body M side is finished (step M107). As regards the remote controller R side, after the completion of origin initialization at the apparatus main body M side is confirmed at step R106, the completion of origin initialization at both of the apparatus main body M side and the remote controller R side is displayed at the display unit 54 of the remote controller R.

At this moment, encoders provided at the picture-taking apparatus main body M side and the remote controller R side can detect absolute positions as required for the control. At step M106, as described, the apparatus main body M is turned back into the state as the power source was switched off last time. This is done because, if the power source is repeatedly turned on and off in the course of the picture-taking work, keeping the last-time picture-taking condition would be preferable.

With regard to the flow D that concerns alignment between the remote controller R side and the apparatus main body M side, if the apparatus main body M is going to be set at the beginning or if the power source has been turned off in the course of the picture-taking work and the operation unit at the remote controller R side has been shifted, there would be deviations between (a) the lens, pan and tilt positions as instructed by the lens operating unit 52, the camera operating unit 53 and the pan and tilt operating unit 57 of the remote controller R and (b) the lens, pan and tilt positions in the apparatus main body M. In consideration of this, in this embodiment, after the origin initialization procedures of the apparatus main body M and the remote controller R are finished, the apparatus main body M is driven toward a position designated by the remote controller R so as to cancel any deviations between the driving unit of the apparatus main body M and the operating units 52, 53 and 57 of the remote controller R.

At step R201, operation signals instructed by the operating units 52, 53 and 57 of the remote controller R are detected and, at step R202, the command signals are transmitted to the apparatus main body M side. In the apparatus main body M, the command signals received at step M201 are distributed by the signal control unit 42 to the lens control unit 13 and the camera control unit 23 of the respective unit devices. At step M202, the control units 13 and 23 of the unit devices operate to electrically drive the unit devices. At step M203, the data obtained at the position detecting unit 14 and the angle detecting unit 33 of each unit device is transmitted to the remote controller R side. At step R203, the position and angular data of each unit device is displayed at the display unit 54 of the remote controller R. Then, at step R204, the positional alignment flow is finished.

As described above, after origin initialization of the detecting system is completed in accordance with the flow A, the apparatus main body M is brought into consistency with commands from the operating units 52, 53 and 57 of the remote controller R in accordance with the flow D, by which the initialization procedure is completed. Once this is accomplished, the apparatus main body M can be controlled exactly in accordance with commands from the operating units 52, 53 and 57 of the remote controller.

Figure 7:
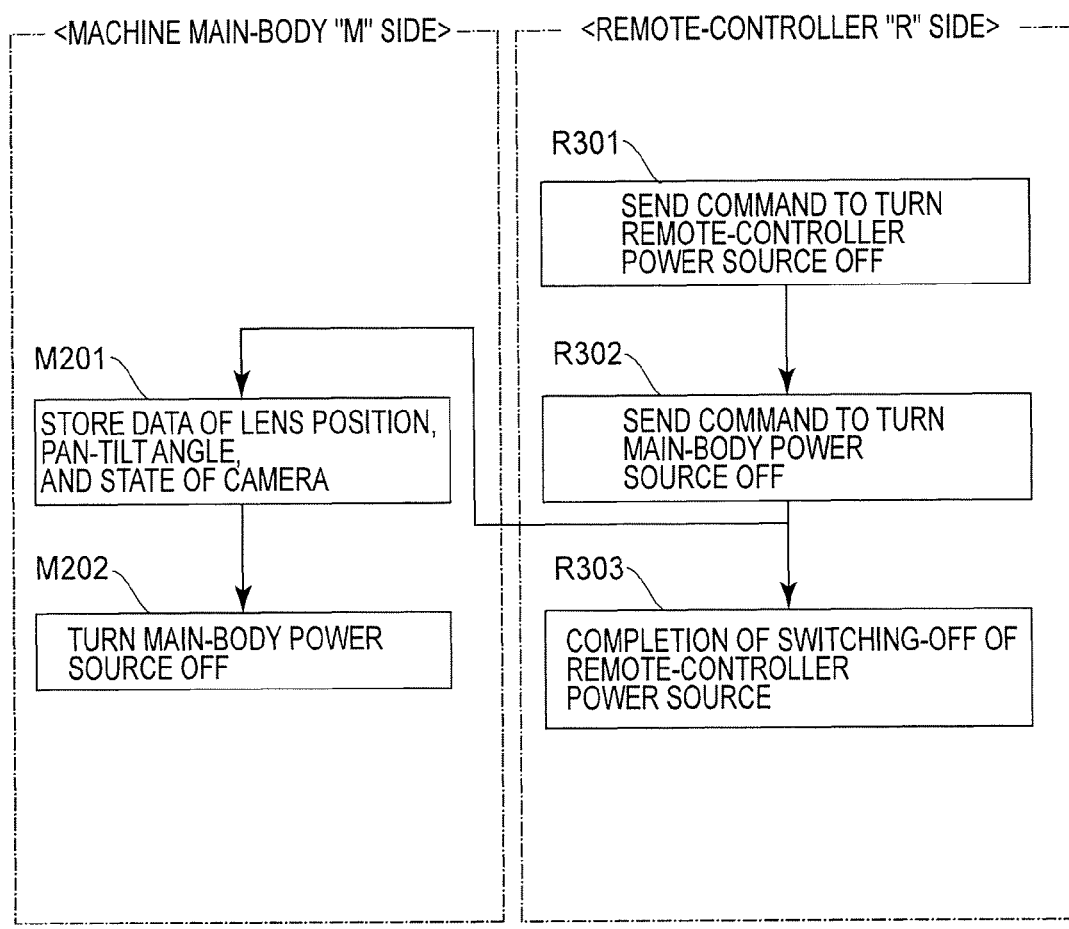
FIG. 7 is a flow chart for explaining a switch-off routine.

FIG. 7 is a flow chart for explaining sequences for turning the power source of the remote controller R off. When at step R301 the switching-off of the power source of the remote controller R is instructed, a power-source switching-off signal is transmitted to the apparatus main body M (step R302). In response to this power-source switching-off signal, at the apparatus main body M side, various data concerning current lens position and pan and tilt angles as well as the state of the camera are memorized (step M201). These data will be used at step M106 in FIG. 6, when the power source is turned on again. At step M202, the power source of the apparatus main body M is turned off. Also, at the remote controller R side, the power source is turned off at step R303.

As described above, the initialization procedure for the apparatus main body M and the remote controller R carries out two processes (flow A) of origin setting of the detection systems and positional alignment between the apparatus main body M and the remote controller R. Here, if the position or angle detection systems of both of the apparatus main body M and the remote controller R use an analog potentiometer in place of an encoder, the origin setting flow A in FIG. 6 may be omitted.

Embodiment 2

In a second embodiment of the present invention, like the first embodiment, a picture-taking apparatus main body M is controlled from a distance through radio, by using a remote controller R. Although the second embodiment has a basic structure similar to that of the first embodiment, it differs from the first embodiment in regard to the initialization procedure when the picture-taking apparatus is set at the beginning or the power source having been switched off in the course of the picture-taking work is turned on again.

In the initialization procedure according to the first embodiment, just after completion of the origin initialization, the apparatus main body M is driven toward the position as instructed by the operating units 52, 53 and 57 of the remote controller R. In this case, however, there is a possibility that the apparatus main body M unexpectedly moves to a direction different from the picture-taking direction. This is unsafe particularly when peoples involved in the competition are around the apparatus main body M. Furthermore, with regard to the lens position, in some cases it is undesirable that the picture-taking condition having already been set is changed unexpectedly. In consideration of this, in the initialization procedure according to the second embodiment, the operating members of the remote controller R are manually operated until they are brought into consistency with the position of the apparatus main body M and, after the consistency is accomplished, the operating commands from the remote controller R side are accepted by the apparatus main body M.

Figure 8A:
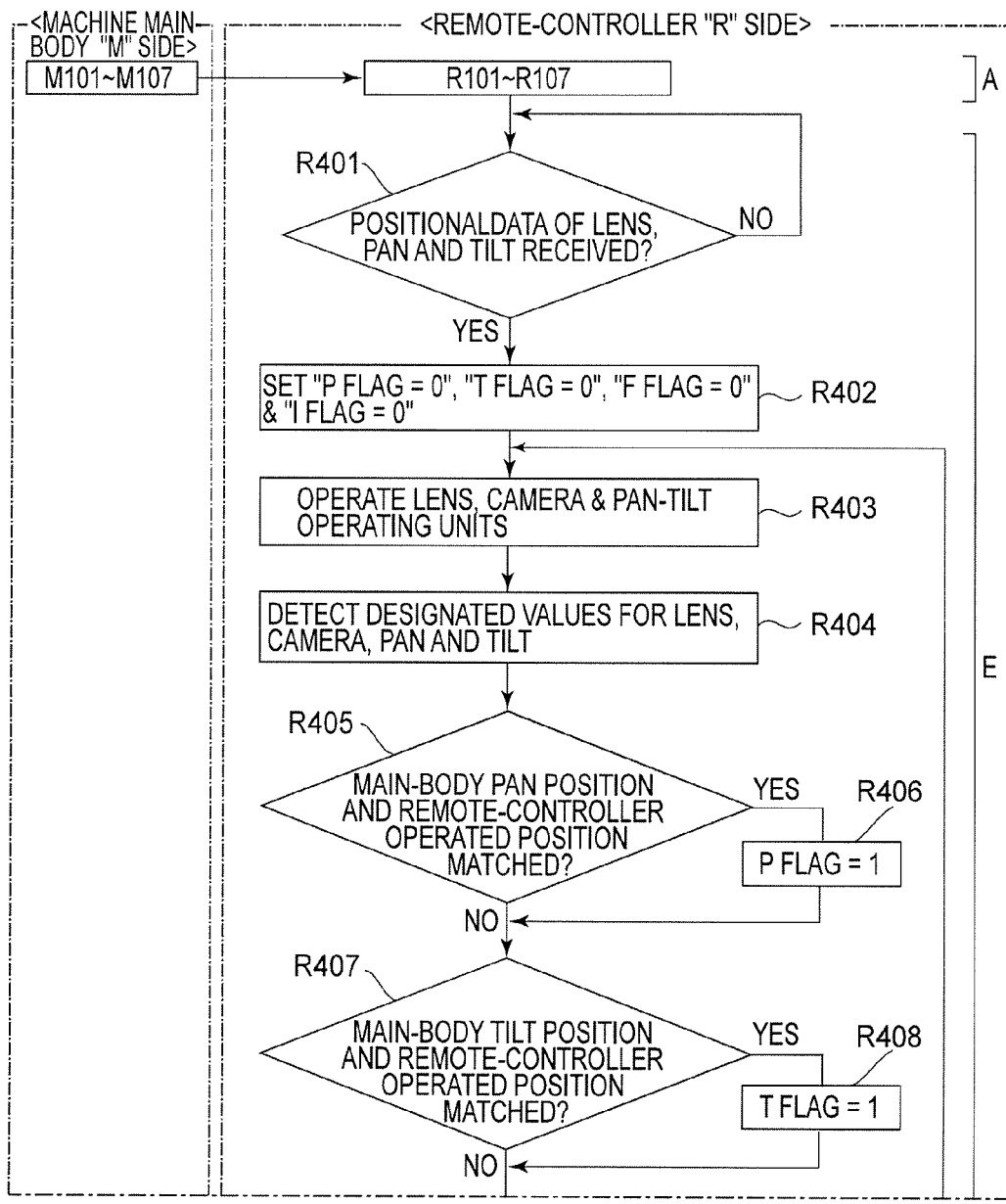
FIG. 8 is a flow chart for explaining an initialization procedure according to a second embodiment of the present invention.
Figure 8B:
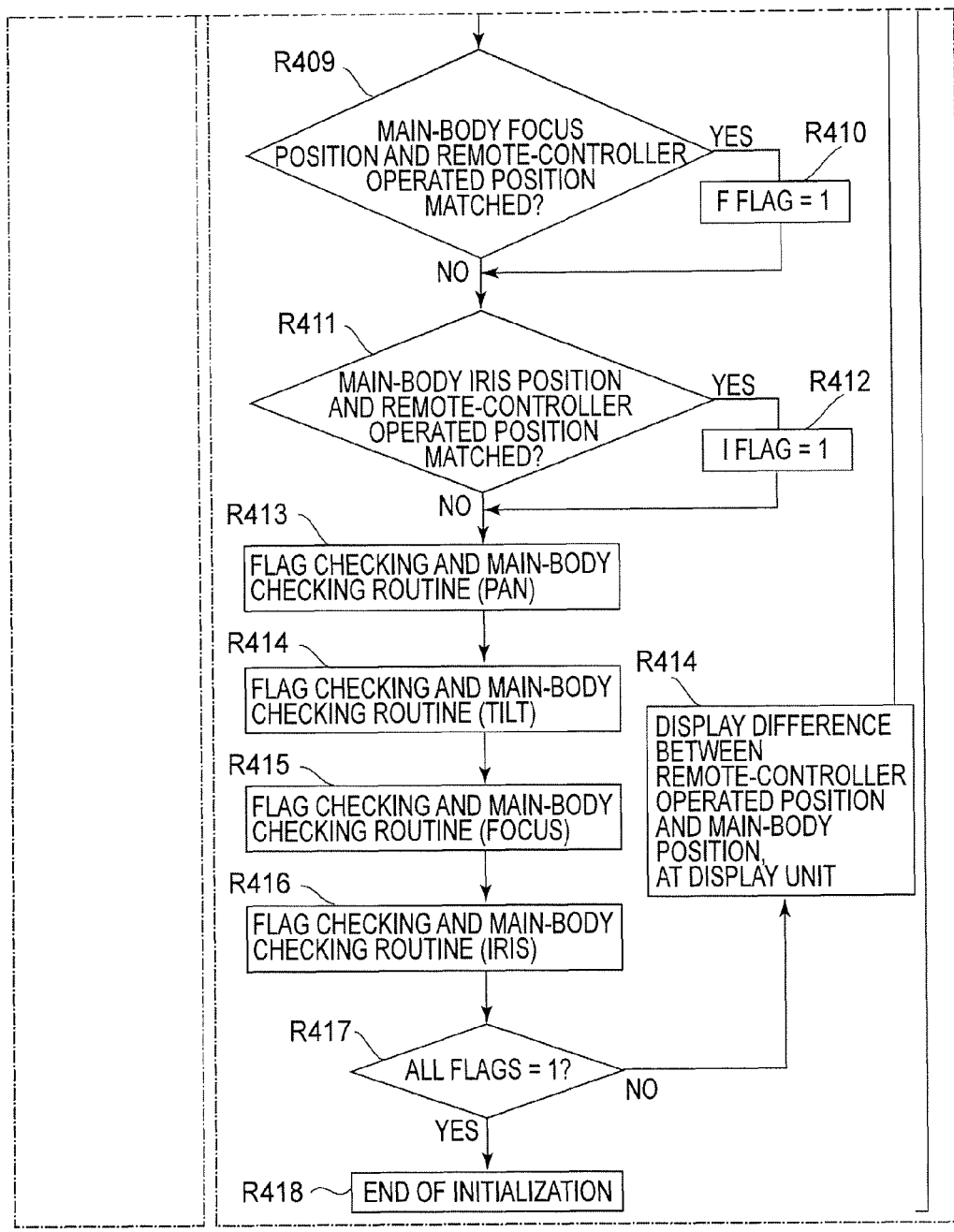

FIG. 8 is a flow chart for explaining origin initialization sequences in accordance with the second embodiment of the present invention. The flow A of origin initialization is the same of the flow A of FIG. 6, having been described with reference to the first embodiment. In the flow E for positional alignment between the apparatus main body M and the remote controller R which is carried out after the origin setting is completed, at step M301 at the apparatus main body M side, the data concerning the lens, pan and tilt positions is transmitted to the remote controller R side after the origin setting in the apparatus main body M is completed.

The lens, pan and tilt positions of the apparatus main body M are received at the remote controller R side (step R401), and the flags P, T, F and I of the pan, tilt, focus lens F and iris I, respectively, are turned "0" (step R402). These flags P, T, F and I represent whether the instructed positions of the operating units 52, 53 and 57 of the remote controller R are consistent with the positions at the apparatus main body M side. These flags are turned "0" at the beginning. If the camera operator manually controls the operating units 52, 53 and 57 of the remote controller R and the instructed values of the operating units 52, 53 and 57 become consistent with the positions of the driving units of the apparatus main body M, the flags are changed to "1".

The pan and tilt unit 31 as well as the focusing lens F and the iris I are all position controlled. Therefore, an alignment procedure is necessary for each of them. However, with regard to the zoom lens Z which is velocity controlled, since the velocity is determined in proportion to the operation angle of the lens operating unit 12, no alignment operation is necessary and the flag setting is not included. At step R403, the camera operator manually controls the operating units 52, 53 and 57 of the remote controller R, and at step R404 the instructed values of the operating units 52, 53 and 57 are detected. At Steps R405 to R412, with respect to each of the pan and tilt unit 31, the focusing lens F and the iris I, the instructed value of the operating units 52, 53 and 57 of the remote controller R and the position of the apparatus main body M are compared with each other. If they are in consistency with each other, the associated flag is turned "1" from "0".

Figure 9:
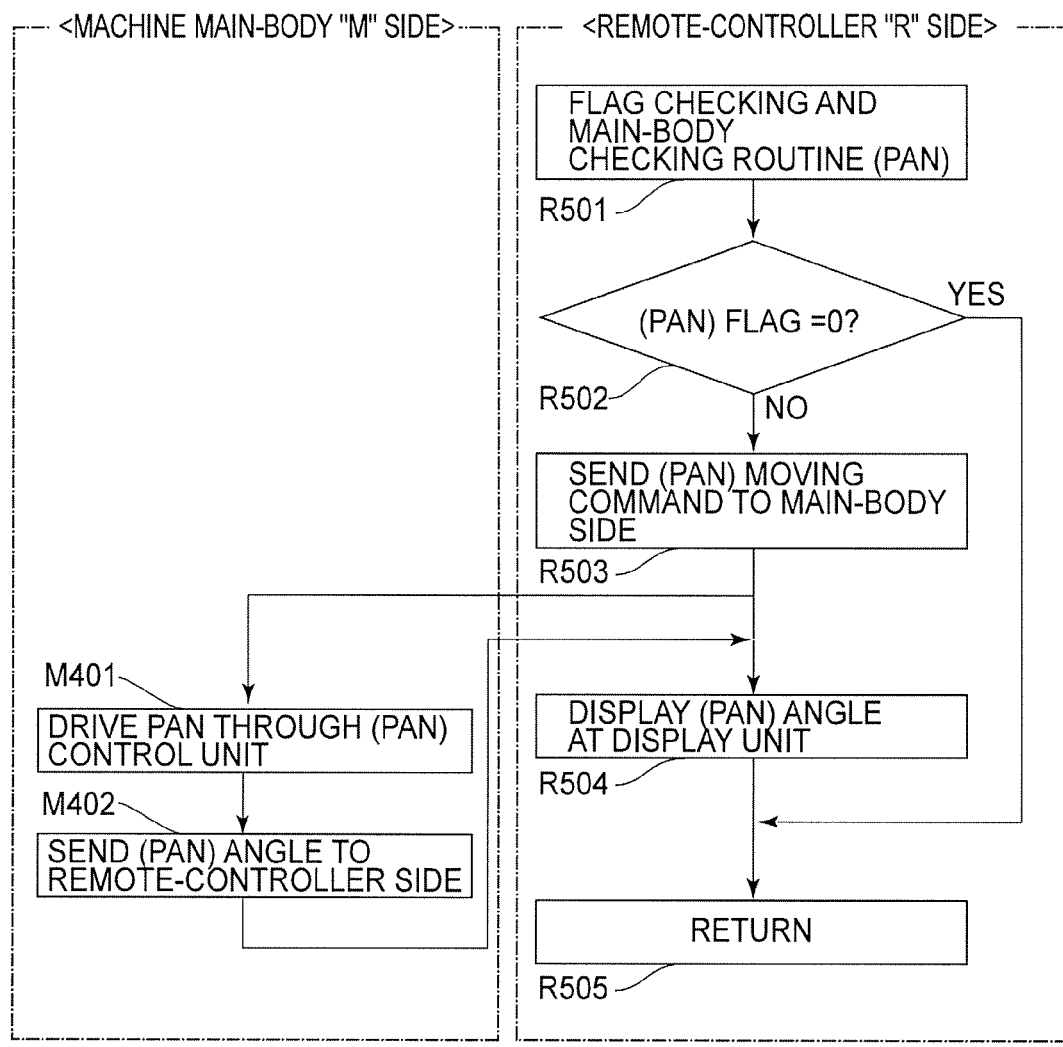
FIG. 9 is a flow chart for explaining a sub-routine.
Figure 10:
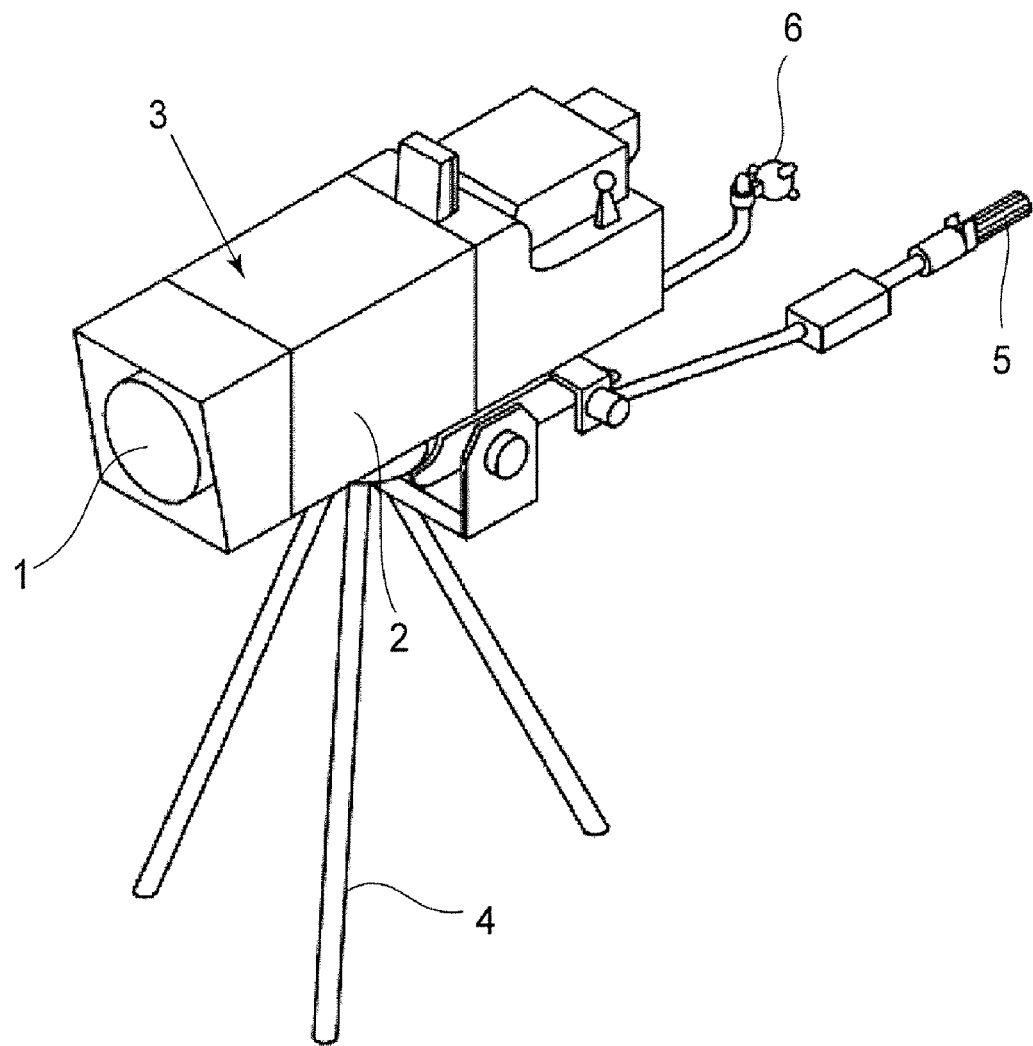
FIG. 10 is a perspective view of a conventional field picture-taking apparatus.

Steps R413 to R416 are a sub-routine for performing confirmation of the flags and drive of the apparatus main body M, in relation to each of the pan and tilt unit 31, the focusing lens F and the iris I. FIG. 9 is a flow chart showing details of this sub-routine. Although this example shows the sequences in regard to the pan shown at step R413, the same sequences apply to the focusing lens F and the iris I. If at step R502 the flag P is "0", that is, the instructed value at the remote controller R side is not consistent with the position at the apparatus main body side, nothing is done and the sequence returns to the original routine (step R505). If at step R502 the flag is "1", that is, the instructed value at the remote controller R side is even once consistent with the position at the apparatus main body side, the instructed value of the remote controller R side is transmitted to the apparatus main body M side (step R503).

At the apparatus main body M side, the pan and tilt control unit 32 of the pan and tilt unit 31 performs pan drive (step M401), and the pan angle is transmitted back to the remote controller R side (step M402). At the remote controller R side, the pan angle is displayed in the display unit 54 (step R504), and then the sequence returns to the original routine (step R505). Substantially the same sequences are carried out at steps R414 to R416.

If all the flags P, T, F and I of the pan, tilt, focusing lens F and iris I are turned "1" (step R417), a sign that represents completion of alignment between the apparatus main body M and the remote controller R is displayed in the display unit 54 of the remote controller R (step R418), whereby the initialization is finished. If there is even a single flag which is "0" (step R417), the difference between the position of the operating unit 52, 53 or 57 of the remote controller R and the position of the driving unit of the apparatus main body M is displayed at the display unit 54 (step R419), and the sequence returns to step R403. This helps the camera operator to perform alignment with respect to the apparatus main body M.

Even if all the four alignment processes with respect to the pan and tilt unit 31, the focusing lens F and the iris I are not complete, in relation to such portion or portions where the alignment has been completed, it is possible to start control of the apparatus main body M by using the remote controller R. Hence, by checking the image displayed at the display unit 54 of the remote controller R, the camera operator can easily get the portion or portions where the alignment has not be completed.

As described above, in the initialization procedure according to the second embodiment of the present invention, the operating members of the remote controller R are manually operated by the camera operator until they are in consistency with the position of the picture-taking apparatus main body M. After they are brought into consistency with the main body position, operation commands from the remote controller R are accepted by the apparatus main body M. This avoids the risk of unexpected motion of the apparatus main body M in an unintended direction when the power source it turned on.

Although in the second embodiment the operation is made in relation to the pan and tilt unit 31, the focusing lens F and the iris I, if the zoom lens Z is position controlled, the zoom lens Z may of course be included in the initialization procedure.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2005-291347 filed Oct. 4, 2005, for which is hereby incorporated by reference.

What is claimed is:

1. A picture-taking apparatus, comprising:
an apparatus main body; and
a remote control device for controlling said apparatus main body,
wherein said apparatus main body includes (i) an image-pickup optical system having a plurality of movable optical elements, (ii) an actuator for moving said plurality of optical elements, (iii) a first optic operating member for instructing movement of said plurality of optical elements, (iv) an image-pickup unit having an image pickup device for photoelectrically converting light from said image-pickup optical system, (v) a first image-pickup operation member for instructing image-pickup operation of said image-pickup unit, (vi) a picture-taking direction operation unit for controlling a picture-taking direction of said apparatus main body, (vii) a picture-taking direction driving unit for moving said apparatus main body into the picture-taking direction, and (viii) an apparatus-main-body-side communication unit for enabling communication with said remote control device, wherein said remote control device includes (ix) a second optic operating member associated with the first optic operating member of said apparatus main body for instructing movement of said plurality of optical elements of said image-pickup optical system at said apparatus main body, (x) a second image-pickup operation member associated with the first image-pickup operation member of said apparatus main body for instructing image-pickup operation of said image pickup unit at said apparatus main body, (xi) a picture-taking direction operation member for instructing a picture-taking direction to said picture-taking direction driving unit, and (xii) a remote-control-device-side communication unit for enabling communication with said apparatus main body, and wherein the first optic operating member, the first image-pickup operation member, and the picture-taking direction operation unit of the apparatus main body each provide manual control of said plurality of optical elements, said image-pickup unit, and the picture-taking direction of said apparatus main body, respectively, and wherein the second optic operating member, the second image-pickup operation member, and the picture-taking direction operation member of the remote control device provide remote control of said plurality of optical elements, said image-pickup unit, and the picture-taking direction of said apparatus main body, respectively, and wherein the remote control device has a structure that provides maneuverability similar to directly maneuvering the apparatus main body.

2. A picture-taking apparatus according to claim 1, wherein, when a power source of said remote control device is turned on, initialization is carried out so as to assure consistency between (a) the position of said optical elements of said image pickup optical system of said apparatus main body as well as the picture-taking direction of said apparatus main body and (b) the instruction for said second optic operating member of said remote control device as well as the instruction for said picture-taking direction operation member.

3. A picture-taking apparatus according to claim 1, wherein the communication between said apparatus-main-body-side communication unit and said remote-control-device-side communication unit is carried out through radio.

4. The picture-taking apparatus of claim 1, wherein the second optic operating member, the second image-pickup operation member, and the picture-taking direction operation member of the remote control device have similar shapes to the first optic operating member, the first image-pickup operation member, and the picture-taking direction operation unit of the apparatus main body, respectively.

* * * * *